United States Patent Office 3,501,549
Patented Mar. 17, 1970

3,501,549
BASIC PRECIPITATION WITH NICKEL PHOSPHATE CATALYST
Charles R. Noddings, Midland, and Ronald G. Gates, Breckenridge, Mich., assignors to The Dow Chemical Company, Midland, Mich., a corporation of Delaware
No Drawing. Filed May 1, 1967, Ser. No. 634,888
Int. Cl. C07c 5/20; B01j 11/34, 11/82
U.S. Cl. 260—680    11 Claims

ABSTRACT OF THE DISCLOSURE

A calcium-nickel co-precipitated complex salt of phosphoric acid which is prepared by co-precipitating the calcium and nickel with the phosphate in the presence of both sodium ion and a nitrogen containing compound. The new catalytic material is useful in the dehydrogenation of alkanes and olefins to their respective dienes.

BRIEF SUMMARY OF THE INVENTION

It has been found that a useful catalytic material, the calcium-nickel complex salt of phosphoric acid, can be prepared by the co-precipitation from an aqueous solution of a water-soluble nickel salt and a water-soluble calcium salt with a water-soluble phosphate when the pH is in the range of about 7 to 9, and in the presence of basic media when both sodium ion and alkaline nitrogen containing compounds are present. The sodium ion and alkaline nitrogen containing compound are employed in a molar ratio of from about 19 to 1, to 1 to 2, respectively. The two aforesaid materials are employed in amounts within the aforesaid ratio to maintain co-jointly the pH during precipitation at from about 7.0 to about 9.0, and preferably from about 7.5 to 8.5. The catalytic co-precipitated material so produced is useful as a dehydrogenating catalyst for converting $C_4$ and higher alkenes, for example, butene directly to butadiene or mixtures of butane and butylene to butadiene, with or without conversion of the butane to butadiene. It is to be understood that good results are achieved when employing $C_4$, $C_5$ and $C_6$ hydrocarbons. In addition to the capability of the present catalyst to dehydrogenate hydrocarbons, the material is also useful as a catalyst for cracking $C_4$ and higher hydrocarbons to lower hydrocarbon skeletons, e.g., $C_4$ to $C_3$ and $C_2$.

DETAILED DESCRIPTION OF INVENTION

The catalyst is conveniently prepared by reacting by mixing, in a proportion to provide from about 6 to about 12 and preferably to about 8 to 9 moles of calcium per mole of nickel, a water-soluble salt of nickel, such as for example, nickel chloride ($NiCl_2$), nickel nitrate ($Ni(NO_3)_2$), nickel acetate ($Ni(OOCCH_3)_2$), or the like, and a water-soluble salt of calcium such as calcium chloride ($CaCl_2$), a calcium nitrate ($Ca(NO_3)_2$), calcium acetate ($Ca(OOCCH_3)_2$), or the like, with about a 100% molecular equivalent of a water-soluble phosphate ion yielding compound.

The novel catalytic material is precipitated from the reaction mixture by employing a combination of sodium ion and alkaline nitrogen compound in proportions such as to establish a pH between about 7.0 to about 9.0. The phosphate compound can be the source of both the phosphate of the catalytic material and provide a majority of the sodium ion when the phosphate compound is sodium phosphate or a mixture of the sodium and ammonium phosphate salts. When the phosphate is such, the small proportions of additional basic media necessary to maintain pH are supplied from either or both (a) the hydroxide form of sodium and/or (b) an alkaline nitrogen compound such as ammonium hydroxide, ammonia gas, or a water-soluble amine. When the phosphate ion-yielding compound is phosphoric acid then, of course, the basicity is established completely from the use of a basic sodium ion generating material and an alkaline nitrogen containing compound, e.g., sodium hydroxide, ammonium hydroxide, ammonia gas and/or water-soluble amine compounds, as for example an aliphatic amine, e.g., methylamine, ethylamine, propylamine, butylamine, hexylamine, and the like.

The pH of the reaction mixture can be maintained between pH 7 and 9 in a continuous manner throughout the addition of reactants by controlling the rate of addition of the various components or the components can be mixed together without regard to pH control and after addition of the ingredients the pH brought to withing the prescribed range of pH 7 to 9 by addition of the appropriate basic media. The reaction mixture is continuously stirred throughout the addition of the reactants and maintained preferably at about room temperature throughout the reaction. However, it is to be understood that some increase in temperature is not harmful. Upon completion of the addition of reactants and adjustment to the final constant pH, if necessary, the slurry-like reaction mixture may be allowed to stand in a quiescent environment until the reaction product has settled. The supernatant liquid above the precipitate can be decanted and the precipitated product can be recovered by any one of the several well-known means for removing residual liquids from solid or semi-solid materials, such as for example, filtering, centrifuging or hot-air drying.

The resulting product is usable as is or it may be formed into compact or compressed forms and shapes in well-known manner. Further, it is sometimes advantageous to promote the activity or prolong the life of the catalyst by admixing therewith $Cr_2O_3$ in a proportion corresponding to from 1 to 10 or more percent by weight or thereabout of the precipitate on a dry basis, and preferably between about 2 to 3 percent by weight.

The reaction for formation of the calcium nickel phosphate and precipitation of the latter to form a catalytic material are readily accomplished from dilute suspensions of the reactants such as a concentration of solids to liquid of 1 to 25 up to 1 to 600, respectively.

The reaction which brings the three ions into a single structure is preferably conducted with mild to vigorous agitation to maintain substantially all of the solids in a high state of suspension. The settling or precipitation of the solids after reaction is, of course, accomplished under quiescent conditions, the supernatant liquid being withdrawn, decanted, from near the top of the settling tank.

The recovery of the catalyst after settling and washing is readily accomplished by filtering or centrifuging. However, drying with air is entirely satisfactory at this stage, although considerable time is necessarily absorbed in such an operation. After recovery by filtering, for example, the filter cake may be treated with $Cr_2O_3$, dried in ovens, crushed, screened, mixed with lubricant, such as graphite or a hydrocarbon oil, and extruded or pressed into suitable forms. While such forming operation is not necessary, it is desirable since it materially facilitates handling and storage of the catalyst.

If the catalyst is formed or shaped and a lubricant is employed to accomplish this, the so-formed catalyst is heated with air to remove the lubricant, e.g., by oxidation and/or vaporization in accordance with conventional procedures.

It is often desirable to treat the catalyst before use with steam or air at elevated temperatures such as 600–750° C. for periods of at least two hours, to insure high yields on the first cycle of hydrocarbon. While not essential, this pre-treatment presumably characterizes or tempers the structure to that which produces the high conversions and unexpected selectivity here disclosed.

The following examples illustrate the present invention, but are not to be construed as limiting:

EXAMPLE 1

In a well-known manner as for example, employing the techniques of U.S. Patent No. 2,542,813, a 1200 cc. of a 26.8 weight percent aqueous solution of nickel chloride, a 6150 cc. of a 34.8 weight percent aqueous solution of calcium chloride, and 1770 cc. of a 74.6 weight percent aqueous solution of phosphoric acid were prepared. The above chemicals were added simultaneously to the vessel reactor, with 3130 cc. of a 13.2 weight percent solution of aqueous ammonium hydroxide and 9150 cc. of a 5 normal aqueous sodium hydroxide at a rate to maintain the pH between 7 and 9, and at a rate to maintain an inventory time at about 2.4 hours. The reaction mass was continuously stirred. In the specific instance, the pH obtained was about 8.1. The reaction was considered complete when the pH remained constant. Thereafter, the reaction mass was allowed to settle for 2.5 hours after which the supernatant liquid above the precipitate was drawn-off (decanted) and the resulting thick slurry filtered. The filtrate was discarded. The cake was washed with water 18 times, then removed and dried at 100° C. in a rotary drier. The dry powder was crushed, mixed with $C_{18}$ wax lubricant ("Sterotex") and expressed into pellets about ¼ inch in diameter and ¼ inch long. The shaped pellets were heated in air at 100° C. until the lubricant was removed. The resulting catalyst pellets were tested as dehydrogenation catalysts at 650° C. or 660° C.

In producing a diolefine employing a catalyst of the present invention, a reaction chamber is charged with the granular catalyst and the lubricant is removed from the catalyst by passing air, or preferably a mixture of about equal volumes of air and steam, through the catalyst bed at a high temperature, e.g., 450° to 750° C. When the lubricant used in preparing the catalyst granules is a substance capable of being vaporized, e.g., a mineral or vegetable oil, the step of treating the catalyst with air may be preceded by one of passing an inert gas such as nitrogen or carbon dioxide over the catalyst so as to vaporize at least a portion of the binding agent from the catalyst granules.

After freeing the catalyst of the lubricant, the catalyst bed is swept free of air with steam and is heated to the desired reaction temperature, preferably by passing superheated steam through the same. A mixture of steam and the olefine reactant, e.g., butylene, amylene, or a hexylene having at least four carbon atoms in the unsaturated carbon chain, is then passed through the catalyst bed at a temperature between 600° and 750° C., and preferably between 650° and 700° C. The usual procedure is to pass the olefine-containing gas into admixture with steam which has been superheated to 750° C. or above, i.e., to a temperature sufficient so that the resultant mixture is at the desired reaction temperature, and to pass the mixture through the bed of catalyst. However, the heat may be supplied in other ways, e.g., by forming the steam and hydrocarbon mixture at a lower temperature and passing the mixture through a preheater to bring it to the desired temperature, or by externally heating the catalyst chamber itself. The yield of diolefine is usually highest when from 10 to 20 volumes of steam are employed per volume of the olefine-containing hydrocarbon, but the steam may be used in smaller or larger proportions if desired. As hereinbefore mentioned, the rate of vapor flow through the catalyst chamber may be varied widely, but in practice the flow usually corresponds to between 100 and 700 liters of the olefine (expressed as at 0° C. and 760 millimeters pressure) per liter of catalyst bed per hour.

The vapors issuing from the catalyst chamber are ordinarily passed through heat exchangers and other cooling devices to condense first the water and then the hydrocarbon products. The concentration of diolefine in the latter is dependent in part upon the concentration of the olefine reactant in the hydrocarbon starting material and cannot definitely be stated. However, when treating n-butylenes as just described, we have obtained, in a single pass, consumption of from 45 to 60 percent of the butylene with formation of a hydrocarbon condensate containing from 35 to 45 percent by weight of butadiene. The diolefine product may be separated from the other hydrocarbons in any of the usual ways, e.g., by reaction with sulphur dioxide or cuprous chloride to form a double compound, and the unreacted olefine may be recycled in the process. By repeatedly recycling the unreacted olefine, a diolefine may be produced in a 60 percent yield or higher and usually in a yield of from 70 to 75 percent of theoretical or higher.

During use in the process, the catalyst gradually accumulates a small amount of carbon, or non-volatile organic material, and loses its activity. Accordingly, flow of the hydrocarbon starting material is periodically interrupted and air, admixed with the steam, is blown through the catalyst bed, e.g., at temperatures between 450° and 700° C. and preferably at the dehydrogenating temperature, to oxidize and remove the carbonaceous or organic material and thus reactivate the catalyst. Usually from 10 and 30 minutes is required to carry out this reactivation step. However, if, during compounding of the catalyst into tablet form, an agent having the property of catalyzing the oxidation of carbon is admixed therewith, the time subsequently required for reactivating the catalyst with steam and air may be reduced markedly. For instance, the incorporation of one or two percent of chromic oxide in the catalyst tablets facilitates reactivation of the catalyst. Other agents having the property of catalyzing the burning of carbon are known to the art.

After completing the reactivation step, the catalyst chamber is again swept free of air with steam and the introduction of an olefine, together with the steam, is resumed. Usually, reactivation of a catalyst is advisable after from 30 to 60 minutes of use in the dehydrogenation reaction. In practice, two or more catalyst chambers are employed in a system provided with connections for passing the reaction mixture alternately through different catalyst beds. One catalyst bed is employed in the dehydrogenation reaction, while another is being reactivated. By operating in this manner, the dehydrogenation reaction may be carried out continuously.

In the following tables, the below listed abbreviations have the meaning:

%C means the percent of the named reactant lost

%S means the percent of the lost material converted to desired product

%Y means $\dfrac{(\%C \times \%S)}{100}$

All temperatures were shell temperatures.

The following tables set forth the pertinent data and results for several runs employing catalytic materials prepared in the above manner wherein the ratio of sodium ion to nitrogen was varied. The hydrocarbon feed was either butane or isopentane.

TABLE I

Test Conditions: STP
Feed: 150 v./v./hr. hydrocarbon
Steam ratio: 20:1
Cycle time: 1.0 hr.
Regeneration:
  Steam, 3,000 v./v./hr.
  Air, 300 v./v./hr.

| Alkali Employed Ratio in moles: | Feed | Temp., °C. | Conversion of Feed | Selectivity to $C_4H_6$ | Selectivity to $C_5H_8$ |
|---|---|---|---|---|---|
| NaOH [a] | $C_4H_{10}$ (n-Butane) | 650 | 15 | 81 | |
| 4 NaOH/1 $NH_3$ | do | 650 | 23 | 82 | |
| 2 NaOH/1 $NH_3$ | do | 660 | 22 | 79 | |
| 1 NaOH/2 $NH_3$ | do | 650 | 17 | 84 | |
| $NH_3$ [b] | do | 660 | 10 | 84 | |
| 4 NaOH/1 $NH_3$ | Isopentane | 650 | 22 | | 72 |

[a] The catalyst prepared for this example while having utility as a dehydrogenation catalyst is difficult to prepare and handle and is not as effective a converter as the catalysts prepared employing ammonium ion in combination.
[b] The catalyst prepared using only ammonium ion is usually nil conversion (1-4%). This catalyst represents the highest conversion obtained and is not reproducible with any high degree of success.

EXAMPLE 2

To illustrate the uniqueness of the present catalytic material when a mixed feed (alkane and alkene) is employed, the following test conditions were employed using the indicated feed and catalysts prepared from the enumerated basic media. Test conditions, feed, etc., all at STP were:

Feed conditions—
  Steam ratio: 10 volume steam/volume hydrocarbon
  Cycle time: 0.3 hr.
Regeneration conditions:
  Steam, 1,500 v./v./hr.
  Air, 150 v./v./hr.
Ratio: $C_4H_{10}:C_4H_8$, 1:1 molarr
n-$C_4H_{10}$ plus n-$C_4H_8$=300 v./v./hr.

TABLE II

| Alkali Employed, mole ratios | Percent Conversion of— | | Percent Selectivity to $C_4H_6$ |
|---|---|---|---|
| | n-$C_4H_8$ | n-$C_4H_{10}$ | |
| 4 NaOH/1 $NH_3$ | 57 | 2 | 84 |
| 2 NaOH/1 $NH_3$ | 60 | 3 | 85 |
| $NH_3$ | 45 | nil | 96 |

The catalysts of the present invention are also useful in the dehydrogenation of olefin feeds to their respective dienes and are capable of development of conversion between 40 and 60% and selectivities of 90 to 80% at temperatures between 600° and 660° C.

CONTINUOUS PROCESS

The catalyst of the present invention can be employed to dehydrogenate alkanes and alkenes or mixtures thereof in a continuous process which comprises passing the gaseous hydrocarbons, selected from the group consisting of aliphatic, alicyclic and phenylaliphatic hydrocarbons having not more than one olefinic double bond and having at least two adjacent saturated aliphatic carbon atoms each bearing at least one hydrogen atom with steam, oxygen or an oxygen-containing gas (air) in the presence of bromine or a bromine-yielding compound (the term "bromine" as used hereinafter shall mean elemental bromine or bromine from a bromine yielding source) into contact with a calcium nickel phosphate catalyst, hereinbefore described, which may have from 0.5 to 5 percent chromic oxide dispersed throughout, at a temperature of from 400° to about 700° C. for a period of time sufficient to effect a dehydrogenation of a substantial quantity of the hydrocarbon to its corresponding diene. The result is achieved by maintaining the hydrocarbon, steam, oxygen and bromine in a molar ratio of from 1 to 1 to .25 to 0.002, respectively, through the ratio of 1 to 40 to 3 to 0.30, respectively. The relative amount of bromine is preferably between about 1 to 10 mole percent based on hydrocarbon. The bromine, which is required for the successful operation of the continuous process, when using the catalyst of the present invention, is introduced as free bromine or as a compound capable of decomposition to yield free bromine, e.g., organic bromine compounds or inorganic bromine compounds such as for example $NH_4Br$ and $HBr$, under the conditions of reaction.

The continuous process employing the catalyst of the present invention is operated without necessity of regeneration. The process equipment is essentially that employed in present day butadiene plants except that only one reactor is necessary per train. Having described in generic terms the process and the catalyst of the present invention, the following description with reference to the flow diagram is set forth.

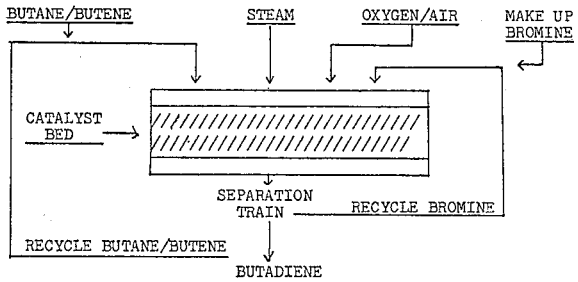

Butane, butene, or a mixture thereof is fed along with steam and oxygen or air to a reactor containing a granular or pellet form of a calcium nickel phosphate catalyst, prepared as afore set forth and preferably containing $Cr_2O_3$, is preheated by sweeping the catalyst bed with steam to bring the bed up to the desired reaction temperature, that is, between 400° and 700° C. and preferably between 450° and 550° C. The preferred manner of operation is hereafter described although it is to be understood wide variations in technique can be employed without substantial loss of the advantages. The hydrocarbon containing gas is passed into admixture with steam which has been superheated to a temperature sufficient so that the resultant mixture is at the desired temperature and under a slight pressure through the bed of catalyst. However, the heat may be supplied in other ways, for example, using preheaters, or by externally heating the catalyst chamber itself.

The steam may be used in amounts sufficient to moderate the temperature rise of the reactants and products through the reaction zone. Generally, 10 to 20 volumes of steam per volume of hydrocarbon are sufficient.

The bromine for the continuous process is initially introduced into the catalyst zone either as a decomposable organic bromine compound or with the gaseous feed as elemental bromine or hydrogen bromide. Once the bromine required for the particular operation is in the system only periodic introductions are required and these to supply the very small losses of bromine from the system.

It is to be clearly understood that the greatest economic advantages are obtained when the process is operated in a continuous manner. However, it is also to be understood that even when operated in a noncontinuous manner certain economics can still be realized and conversions and selectivities per pass remain high although it is apparent overall efficiencies will be lower by at least the services used during regeneration or holding without feed.

The amount of oxygen employed in successful operations of the continuous process ranges from about 50 to 300 percent of that theoretically capable of reacting with the theoretical hydrogen removed to obtain the desired product. Preferably, however, the oxygen is employed in from between about 170 to 190 percent of that stoichiometrically required to produce the desired product.

The space velocity of the reactants or reactant hydrocarbon can vary from about 50 to 500 volumes of hydrocarbon per volume of catalyst per hour. Preferably, the space velocity of the reactant or reactants varies from about 100 to about 300 v./v./hour.

A vapor mixture of steam, cracked-oil-gas consisting of for the most part aliphatic hydrocarbons containing 4 carbon atoms, or pure butane, or butene or mixture of the latter two pure gases, oxygen and various sources of bromine was passed in continuous flow through a 1 inch I.D. 446 S.S. or silica tubular reactor containing 150 or 525 cubic centimeters of a calcium nickel phosphate catalyst containing 2 percent chromium oxide and prepared in acordance with Example 1. The catalyst chamber was capable of being heated as necessary to provide if desired isothermal conditions. The ratio of gases, steam, oxygen, bromine, temperatures, pressure and the composition of the vapor issuing from the bed of catalyst as percent conversion of $C_4H_8$ and $nC_4H_{10}$ as well as the selectivities and yields to butadiene are set down below. The vapors issuing from the catalyst bed are cooled in stages to condense the water vapor and then condense the hydrocarbons. The bromine, if any, in these vapors is recovered.

The following table sets forth the data of operations using the catalyst of the present invention under the continuous process conditions and compares it with a catalyst of commercial quality prepared in the manner of U.S. Patent 2,542,813.

equivalents of sodium ion per molar equivalent of nitrogen in an alkaline nitrogen compound with stirring; said calcium salt being employed in an amount to provide between about 6 and about 12 moles of calcium per mole of nickel and said phosphate compound being employed in an amount to provide about a molecular equivalent of phosphate per mole of combined nickel and calcium.

2. A method for dehydrogenating alkenes to their corresponding diolefins which comprises passing said alkene through a bed of catalyst of claim 1 at a temperature of from between 600° to 700° C., in the presence of 10 to 40 volumes of steam per volume of hydrocarbon.

3. The calcium nickel phosphate catalyst of claim 1 wherein said calcium is present in from 8 to 9 moles per mole of nickel.

4. The method of claim 2 wherein said alkene is butylene.

5. The method of claim 2 wherein said alkene is isopentene.

6. The method of catalytically dehydrogenating hydrocarbons comprising continuously passing a reactant hydrocarbon at a space velocity of from 50 to 500 volumes of hydrocarbon per volume of a catalyst per hour through a catalyst bed containing catalyst of claim 1 while simultaneously passing through said reaction zone steam in an amount of from 1 to about 40 moles per mole of hydrocarbon, oxygen in an amount of from .25 to 3 moles per mole of reactant hydrocarbon, and bromine in an amount of from 0.002 to .3 mole/mole of hydrocarbon per hour and maintaining the reaction zone at a temperature of from about 400° C. to about 700° C.

7. The method of claim 6 wherein chromium oxide in an amount from about 1 to about 10 percent of the weight of said metal phosphate material is employed in intimate admixture with said catalyst.

8. In the method of claim 6 wherein said hydrocarbon is butylene.

9. In the method of claim 6 wherein said hydrocarbon is butane and butylene.

10. In the method of claim 7 wherein 170 to 190 percent of that oxygen stoichiometrically necessary to convert the hydrocarbon reactants to the desired product is employed.

11. A method for preparing a catalyst by reacting a water-soluble calcium salt with a water-soluble nickel salt and a phosphate ion-yielding compound at a pH of between about 7 and about 9, which pH is developed and maintained by employment of from 0.5 to 19 molar equivalents of sodium ion per molar equivalent of nitrogen in an alkaline nitrogen compound with stirring; said calcium salt being employed in an amount to provide between about 6 and about 12 moles of calcium per mole of nickel and said phosphate compound being employed in an amount to provide about a molecular equivalent of

| Catalyst* | $1-C_4H_8$ | $n-C_4H_{10}$ | $O_2$ | $Br_2$ | Steam (out) | T,° C. | Percent C $1-C_4H_8$ | Percent C $n-C_4H_{10}$ | Percent C Total | Percent S to $C_4H_6$ | Percent Y to $C_4H_6$ |
|---|---|---|---|---|---|---|---|---|---|---|---|
| NaOH/NH$_4$OH: | | | | | | | | | | | |
| 2/) | 77 | 86 | 93 | 3.2 | 3,000 | 500 | 65 | 27 | 45 | 91 | 41 |
| 0/) | 71 | 80 | 100 | 3.2 | 3,200 | 500 | 61 | 25 | 42 | 92 | 39 |

*Procedure of Example 1 varying only ratio NaOH to NH$_4$OH.

The catalyst of the present invention shows a 7% increase in productivity over the commercial catalyst when they are employed under the most advanced process conditions.

It is to be noted that the continuous process conditions admit of up to a ten-fold improvement in productivity of conversion of butane at a temperature of about 150° C. lower than the commercial cyclic process.

We claim:

1. A calcium nickel phosphate catalyst prepared by reacting a water-soluble calcium salt with a water-soluble nickel salt and a phosphate ion-yielding compound at a pH of between about 7 and about 9, which pH is developed and maintained by employment of from 0.5 to 19 molar phosphate per mole of combined nickel and calcium.

References Cited

UNITED STATES PATENTS

| 2,442,319 | 5/1948 | Britton et al. | 260—680 |
| 2,542,813 | 2/1951 | Heath | 252—437 X |
| 3,298,966 | 1/1967 | Bagnetto | 260—680 X |
| 3,383,429 | 5/1968 | Noddings | 260—669 |

PAUL M. COUGHLAN, Jr., Primary Examiner

U.S. Cl. X.R.

252—437